United States Patent
Yang et al.

(10) Patent No.: US 9,521,622 B2
(45) Date of Patent: Dec. 13, 2016

(54) NON-CODEBOOK BASED PRECODING FOR MULTI-USER MIMO DOWNLINK

(75) Inventors: Yu-Han Yang, New Taipei (TW); Yonggang Hao, Waltham, MA (US); William Plumb, Charlestown, MA (US); Timothy Perrin Fisher-Jeffes, Cambridge, MA (US); Jangwook Moon, Westford, MA (US); Zoran Zvonar, Boston, MA (US); Tze-Ping Low, Winchester, MA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 131 days.

(21) Appl. No.: 13/309,571

(22) Filed: Dec. 2, 2011

(65) Prior Publication Data
US 2013/0142128 A1  Jun. 6, 2013

(51) Int. Cl.
*H04W 52/02* (2009.01)

(52) U.S. Cl.
CPC ........... *H04W 52/0238* (2013.01); *Y02B 60/50* (2013.01)

(58) Field of Classification Search
USPC .......... 455/522, 452.1; 370/329, 522, 452.1; 375/224, 262, 347
See application file for complete search history.

(56) References Cited

U.S. PATENT DOCUMENTS

| 7,940,871 B2 * | 5/2011 | Rooyen ................ H04B 7/0848 370/206 |
| 8,369,791 B2 * | 2/2013 | Hafeez ................ H04B 7/0452 370/252 |
| 2009/0262695 A1* | 10/2009 | Chen et al. .................... 370/329 |
| 2010/0190507 A1* | 7/2010 | Karabinis et al. . H04B 7/18513 455/452.1 |
| 2011/0070918 A1* | 3/2011 | Hafeez .......................... 455/522 |
| 2011/0317748 A1* | 12/2011 | Li et al. ............... H04B 7/0417 375/219 |

FOREIGN PATENT DOCUMENTS

| CN | 101951678 A | 1/2011 |
| CN | 102143588 A | 8/2011 |
| CN | 102150378 A | 8/2011 |
| CN | EP 2637339 A1 * | 9/2013 ........... H04B 7/0456 |

\* cited by examiner

*Primary Examiner* — Andrew Lai
*Assistant Examiner* — Jamaal Henson
(74) *Attorney, Agent, or Firm* — Winston Hsu; Scott Margo

(57) ABSTRACT

A wireless communication system is provided that includes a base station receiving a plurality of input signals that are selectively provided to a plurality of precoders. The precoders perform precoding operations on the input signals and output a first signal. The base station includes an algorithm that minimizes total transmit power per antenna under signal to interference and noise ratio (SINR) target constraints or maximizes the SINR under a sum of power constraint so as to determine power allocation and obtain efficient precoders. A number of mobile receiver units receive the first signal and performs their respective operations to extrapolate the linear estimate of the input signals.

16 Claims, 3 Drawing Sheets

NON-CODEBOOK BASED PRECODING FOR MULTI-USER MIMO DOWNLINK

BACKGROUND

The invention is related to the field of wireless communications, and in particular to an iterative algorithm to calculate precoders in a multi-user downlink multiple-input and multiple-output (MIMO) system.

The precoding schemes in long term evolution (LTE) can be codebook-based or non-codebook based. For codebook-based precoding, the UE (mobile receiver unit) estimates the channel using cell-specific reference signals (CRS) and feedbacks the precoder matrix index (PMI) and Rank Index (RI) to the base station (BS). The BS can choose to apply such precoder. For non-codebook-based precoding, the BS needs more accurate channel state information (CSI). (e.g., in time division duplex (TDD), CSI can be obtained using uplink reference signals.) The transmission modes 7, 8, and 9 can support non-codebook-based precoding with single-layer, two layers, and eight layers transmission, respectively The detailed procedures of non-codebook-based precoding are described as follows. Considering the time division duplex (TDD) mode, to design the non-codebook-based precoder, the BS uses the uplink pilots called sounding reference signals (SRS) to estimate the uplink CSI. Due to the channel reciprocity in TDD, the BS can obtain the downlink CSI using uplink CSI, and design the corresponding precoder. The UEs do not need to be informed about this precoder since the UEs can estimate the equivalent channel (the composite effect of the precoder and the channel) with the presence of demodulation reference signals (DM-RS, or dedicated reference signals, DRS), which is inserted before precoding. Therefore, the receive beamforming vector (for single data stream) or matrix (for multiple data streams) can be accordingly designed by the UEs.

Other non-codebook-based precoding designs use CRS or DRS. The DRS design has the UE (mobile receiver) use the DRS to estimate the equivalent channel as described above, and designs the receive beamformer. The CRS design has the UE use the CRS to estimate the CSI, which does not contain the effect of the precoder. In this case, the receiver can only design the receive beamfomer according to the channel. Intuitively, the CRS based scheme provides less information to the UE than the DRS based scheme. Thus it is expected that the DRS based scheme should perform better than the CRS based scheme. Thus, non-codebook-based precoding can achieve better performance, but requires extra signaling and computational overhead.

SUMMARY

According to one aspect of the invention, there is provided a wireless communication system. The wireless communication system includes a base station that receives a plurality of input signals that are selectively provided to a plurality of precoders. The precoders performs precoding operations on the input signals and outputs a first signal. The base station includes an algorithm that minimizes total transmit power per antenna under signal to interference and noise ratio (SINR) target constraints and maximizes the SINR under a sum of power constraint so as to determine power allocation and obtain efficient precoders. A number of mobile receiver units receive the first signal and performs their respective operations to estimate the input signals.

According to another aspect of the invention, there is provided a method of performing the operations of a wireless communication system. The method includes receiving a plurality of input signals that are selectively provided to a plurality of precoders using a base station. The base station includes an algorithm that minimizes total transmit power per antenna under signal to interference and noise ratio (SINR) target constraints and maximizes the SINR under a sum of power constraint so as to determine power allocation and obtain efficient precoders. Also, the method includes positioning a plurality of mobile receiver units that receive the first signal and performs their respective operations to estimate the input signals.

These and other objectives of the present invention will no doubt become obvious to those of ordinary skill in the art after reading the following detailed description of the preferred embodiment that is illustrated in the various figures and drawings.

DETAILED DESCRIPTION

The invention proposes an iterative algorithm to calculate the precoders in a multi-user downlink MIMO system, where each user can receive multiple data streams. One can apply the Maximum signal to interference and noise ratio (SINR) filter, which is based on the criterion of maximizing sum SINR of the jointly encoded multiple data streams within a user. It has been shown that such criterion can make the jointly decoding become close to maximum likelihood (ML) decoding.

The invention proposes two algorithms. One is to minimize the total transmit power under SINR target constraints; the other is to maximize the SINR under a sum power constraint. Simulation results demonstrate the proposed algorithm significantly outperforms other conventional methods such as zero-forcing (ZF), block-diagnalization (BD), and signal-to-leakage-and-noise ratio (SLNR).

The inventive precoder design involves the Receive beamforming design so it becomes very complicated to obtain the optimum. Two of the best designs for per-antenna power constraints are proposed by the downlink-uplink duality for per-antenna power constraints and the minimization of weighted SINR per stream.

The downlink-uplink duality for per-antenna power constraints are discovered using Lagrangian duality. This leads to iterative algorithms which calculate in the virtual uplink and the obtained solution can be transformed back to the downlink. For example, this duality is applied to the beamforming for SINR balancing problem for single data stream. Also, one can consider the duality for sum power constraints to help solve the downlink capacity problem which has been open for a long time and just solved in recent years. Such duality is not only useful for the information theoretical problem but also valuable for practical designs. For example, some downlink joint beamforming and power allocation problems can be solved optimally or sub-optimally by utilizing the duality.

In the other approach, the minimization of weighted SINR per stream is considered where it is found that given fixed received beamformers, the transmit beamforming design is a quasi-convex problem and can be solved using bisection search combined with convex optimization. Given the transmit beamformers, the optimal receive beamformers are simply the MMSE filter. Therefore, the invention proposes to iteratively calculate the transmit and receive beamformers by fixing one while optimizing the other.

Figure 1:
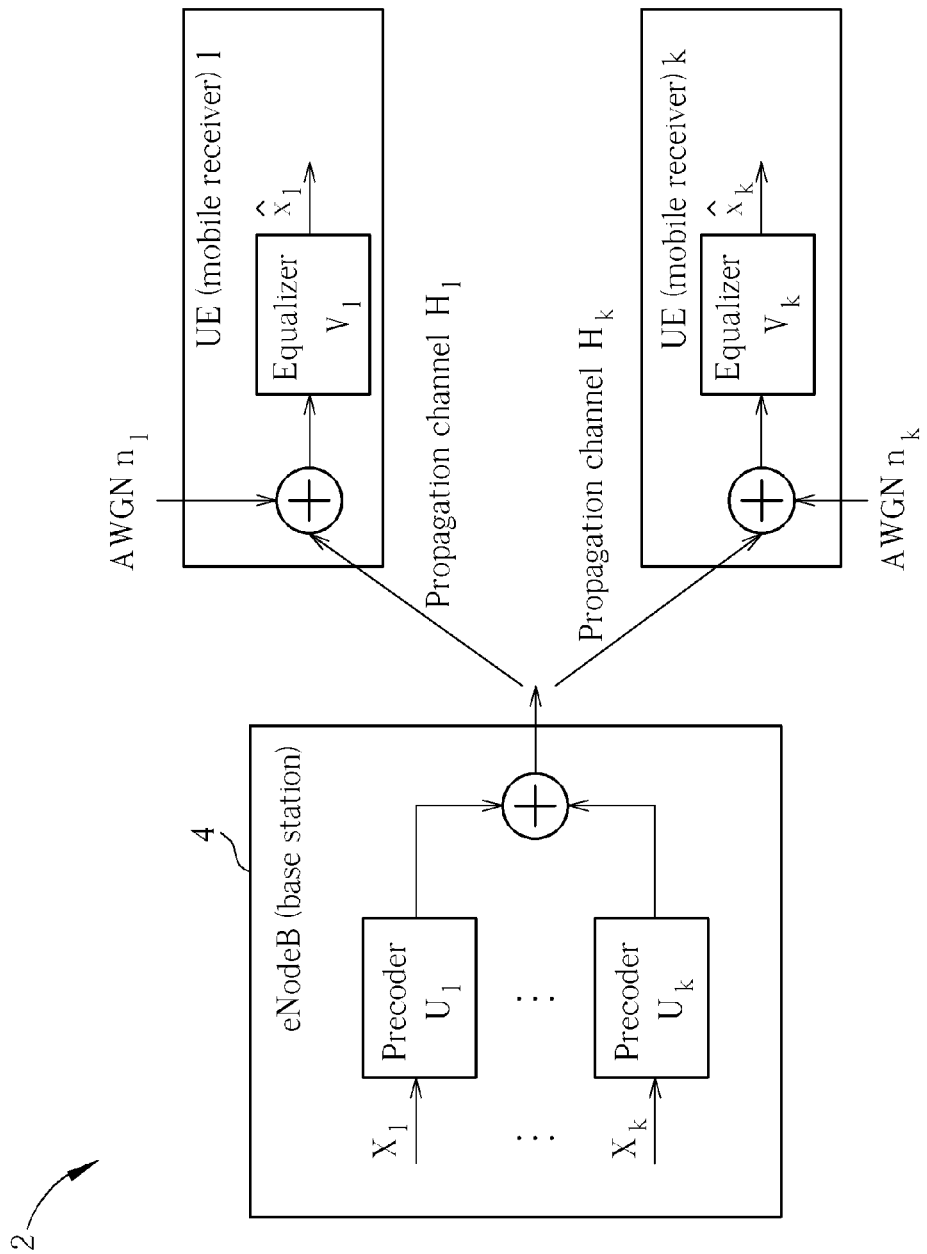
FIG. 1 is a schematic diagram illustrating a downlink system used in accordance with the invention.

FIG. 1 is a schematic diagram illustrating a downlink system 2 used in accordance with the invention with one base station (BS) 4 and Kusers, each can be equipped with multiple antennas. The downlink system 2 includes the BS 4 that includes a plurality of precoders $U_1 \ldots U_k$ that send out a signal to respect UE or receiver units 1 ... K. Each receiver unit 1 ... K is associated with a respective propagation channel $H_1 \ldots H_K$. The transmitted signal from the base station is received by each receiver unit 1 ... K where the transmitted signal is added with the White Gaussian noise signal (AWGN) $n_1 \ldots n_K$ associated with each respective receiver unit 1 ... K. Afterwards, receiving beamformers or equalizers $V_1 \ldots V_K$ output linear estimates $\hat{x}_1 \ldots \hat{x}_K$ for each receiver unit 1 ... K using the sum of the transmitted signal and AWGN $n_1 \ldots n_K$ for each of the respective receiver unit 1 ... K.

The BS 4 with Nt antennas is transmitting Lk data streams to user k with Nr,k receive antennas. The precoder for user k's data streams xk is denoted by an $N_t \times L_k$ matrix Uk, where each element of xk is uncorrelated with each other and has zero mean and unit variance pk is the power allocated to user k. One can assume equal power allocation within xk, that is, each data stream is allocated with power of $p_k/L_k$. The receive beamformer or equalizer of user k is denoted by an $L_k \times N_{r,k}$ matrix Vk.

After receive beamforming, the linear estimate of user k can be expressed as $$\hat{x} = V_k^H H_k \left( U_k \sqrt{\frac{p_k}{L_k}} I_{Lk} x_k + \sum_{j \neq k} U_j \sqrt{\frac{p_k}{L_j}} I_{Lj} x_j \right) + V_k^H n_k \quad (1)$$

where $n_k$ denotes the noise vector, each element is independent with each other and has zero mean and variance of $\sigma_k^2$.

If one uses the Maximum SINR (MSINR) filters as the receive beamformers or equalizers, then the sum SINR of user i's data streams can be written as $$\overline{SINR_i} = \frac{\frac{p_i}{L_i}\|V_i^H H_i U_i\|_F^2}{\sum_{j \neq i} \frac{p_j}{L_j}\|V_i^H H_i U_j\|_F^2 + L_i \sigma_i^2} \quad (2)$$

In order to design the precoders U and power allocation $P=[p_1\ p_2\ \ldots\ p_K]^T$ by minimizing the sum power with the per-antenna power constraints $\{P_i\}_{i=1}^{Ns}$ 1 and SINR targets $\{\gamma_i\}_{i=1}^K$, one can formulate the optimization problem as follows:

$$\rho^{DL}: \min_{p,U} \sum_{i=1}^{N_t} \left[\sum_{j=1}^{K} \frac{p_j}{L_j} U_j U_j^H\right]_{i,i} \quad (3)$$

$$\text{s.t. } \left[\sum_{j=1}^{K} \frac{p_j}{L_j} U_j U_j^H\right]_{i,i} \leq P_i, i=1,\ldots,N_t \quad (4)$$

$$\frac{\frac{p_i}{L_i}\|V_i^H H_i U_i\|_F^2}{\sum_{j \neq i} \frac{p_j}{L_j}\|V_i^H H_i U_j\|_F^2 + L_i \sigma_i^2} \geq \gamma_i, i=1,\ldots,K \quad (5)$$

In other convention approaches such as Zero-forcing (ZF), the ZF precoder cancels all the inter-stream interference as shown in the following relation:

$$\begin{bmatrix} H_1 \\ \ldots \\ \ldots \\ \ldots \\ H_K \end{bmatrix} [U_1\ \ldots\ U_k] = I \quad (6)$$

To achieve this, the precoder U can be chosen as the pseudo-inverse of the channel matrix H.

Also, the commonly known block-diagonalization (BD) precoder cancels all the inter-user interference as follows $$\begin{bmatrix} H_1 \\ \ldots \\ H_{k-1} \\ H_{k+1} \\ \ldots \\ H_K \end{bmatrix} U_k = 0 \quad (7)$$

That is, $U_k$ is in the null space of the channel matrices of other users. In order to find the feasible BD precoder, the channel dimension has to satisfy $N_t - \sum_{j \neq k} N_{r,k} \geq L_k$.

Moreover, the commonly known signal-to-leakage noise ratio (SLNR) precoder is used to find U which maximizes the SLNR.

$$u_{kl} = \underset{u}{\operatorname{argmax}} SLNR_k \quad (8)$$

$$= \underset{u}{\operatorname{argmax}} \frac{u^H R_{s,k} u}{u^H R_{n,k} u} \quad (9)$$

where $$R_{s,k} = H_k^H H_k \quad (10)$$

$$R_{n,k} = \sum_{j \neq k} H_j^H H_j + \sigma_k^2 I \quad (11)$$

Then $u_{kl}$ satisfies $$R_{s,k} u_{kl} = \lambda_{max} R_{n,k} u_{kl} \quad (12)$$

Thus, $u_{kl}$ is the eigenvector corresponding to the maximum eigenvalue of the eigen-problem.

The Lagrangian duality of the above problem $\rho^{DL}$ is considered. It will be shown that the dual problem is a SINR constrained uplink weighted sum power minimization problem, where the weighted coefficients are the downlink noise variances, and the uplink noise variances are the Lagrange multipliers for the per antenna power constraints in the downlink. Such duality can help to develop algorithms to calculate the precoders and power allocation.

The Lagrangian for the above problem $\rho^{DL}$ is given by $$\varsigma(p, \lambda, q) = \sum_{i=1}^{N_t} \left[\sum_{j=1}^{k} \frac{p_j}{L_j} U_j U_j^H\right]_{i,i} + \sum_{i=1}^{N_t} \lambda_i \left[\left[\sum_{j=1}^{k} \frac{p_j}{L_j} U_j U_j^H\right]_{i,i} - P_i\right] - \sum_{i=1}^{K} q_i \left[\frac{1}{\gamma_i} \frac{p_i}{L_i} \|V_i^H H_i U_i\|_F^2 - \sum_{j \neq i} \frac{p_j}{L_i} \|V_i^H H_i U_i\|_F^2 - L_i \sigma_i^2\right] \quad (13)$$

$$= \sum_{i=1}^{K} L_i \sigma_i^2 q_i - \sum_{j=1}^{N_t} \lambda_j P_j - \sum_{i=1}^{K} \frac{p_j}{L_i} \quad (14)$$

$$\left[\frac{1}{\gamma_i} q_i \|U_i^H H_i^H V_i\|_F^2 - \sum_{j \neq i} q_j \|U_j^H H_j^H V_j\|_F^2 - tr(U_i^H (I + \Lambda) U_i)\right]$$

where (14) is just reordering of the terms such that the Lagrange multipliers $|q_i|_{i=1}^{K}$ for the downlink SINR constraints correspond to the uplink power allocation. From (14), the dual problem is $$\min_{\lambda, q} \sum_{i=1}^{K} L_i \sigma_i^2 q_i - \sum_{j=1}^{N_t} \lambda_j P_j \quad (15)$$

$$\text{s.t.} \quad \frac{q_i \|U_i^H H_i^H V_i\|_F^2}{\sum_{j \neq i} q_j \|U_i^H H_j^H V_j\|_F^2 + tr(U_i^H (I + \Lambda) U_i)} \geq \gamma_i, \quad (16)$$

$$i = 1 \ldots, K$$

From this, one can see that the optimal uplink receive beamforming is also Maximum SINR filtering. Therefore, one can compute U in the uplink using the MSINR receive beamforming.

The invention utilizes two scenarios, first scenario is when one is given SINR targets to minimize the total transmit power and the second scenario is when given a sum power constraint to maximize the achievable balanced SINRs.

The following relation defines the power minimization problem used in accordance with the invention.

$$\rho^{DL}: \min_{p, U} \sum_{i=1}^{N_t} \left[\sum_{j=1}^{K} \frac{p_j}{L_j} U_j U_j^H\right]_{i,i} \quad (17)$$

$$\text{s.t.} \quad \left[\sum_{j=1}^{K} \frac{p_j}{L_j} U_j U_j^H\right]_{i,i} \leq P_i, i = 1, \ldots, N_t \quad (18)$$

$$\frac{\frac{p_i}{L_i} \|V_i^H H_i U_j\|_F^2}{\sum_{j \neq i} \frac{p_j}{L_j} \|V_i^H H_i U_j\|_F^2 + L_i \sigma_i^2} \geq \gamma_i, i = 1, \ldots, K \quad (19)$$

Figure 2:
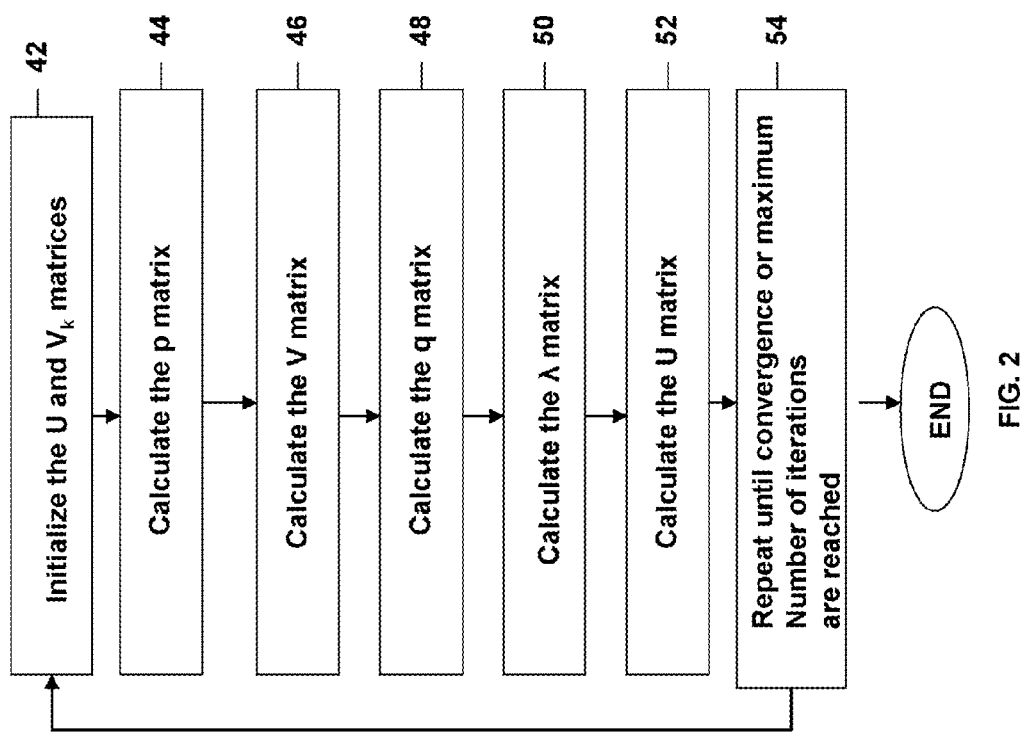
FIG. 2 is a process flow illustrating the iterative steps used to determine power minimization under SINR target constraints.

FIG. 2 is a process flow illustrating the iterative steps used to determine power minimization under SINR target constraints. First, the $V_k$ matrix is initialized as some random matrix and $\lambda_k=0$, and the U matrix is initialized as a transmit MMSE filter, as shown in step 42. The p matrix is calculated using the BcPA_inv function used in downlink power allocation, as shown in step 44. The V matrix is calculated using the BcR×MSINR function used in downlink receive MSINR beamforming, as shown in step 46. The q matrix is calculated using the MacPA_inv function used in uplink power allocation, as shown in step 48. The $\lambda$ matrix is calculated using the SubgradLambda function used in the Subgradient method, as shown in step 50. The U matrix is calculated using the MacR×MSINR function used in the uplink receive MSINR beamforming, step 52. The following steps 42-52 are repeated until convergence or the maximum number of iterations is reached, as shown in step 54. The definition of convergence is when the difference of the minimum required power in the current iteration and the previous iteration does not change more than a small number $\epsilon$.

As discussed above, the function BcPA_inv is used for downlink power allocation with SINR targets. The function BcPA_inv is defined as follows:

$$\Phi_{k,j} = \text{trace}(V_k^H H_k U_j U_j^H H_k^H V_k)/L_k, \text{ for } k \neq j \quad (20)$$

$$\Phi_{k,j} = 0 \text{ for } k = j \quad (21)$$

$$D = \text{diag}[[\text{trace}(V_1^H H_1 U_1 U_1^H H_1^H V_1)/(L_1 \gamma_1), \ldots, \text{trace}(V_K^H H_K U_K U_K^H H_K^H V_K)/(L_K \gamma_K)]] \quad (22)$$

$$\sigma = [L_1 \sigma_1^2, \ldots, L_K \sigma_K^2]^T \quad (23)$$

$$p = (D - \Phi)^{-1} \sigma \quad (24)$$

The function BCR×MSINR, as discussed above, is used in downlink receive MSINR beamforming. The BCR× MSINR is defined as follows $$R_{s,k} = \frac{p_k}{L_k} H_k U_k U_k^H H_k^H \quad (25)$$

$$R_{n,k} = \sigma^2 I_{N_r,k} + \sum_{j \neq k} \frac{p_j}{L_j} H_k U_j U_j^H H_k^H \quad (26)$$

$$V_k = \text{eig}(R_{s,k}, R_{n,k}) \quad (27)$$

The function MacPA_inv, as discussed above, is used in uplink power allocation with SINR targets. The MacPA_inv is defined as follows:

$$\Phi_{k,j} = \text{trace}(V_k^H H_k U_j U_j^H H_k^H V_k) \text{ for } k \neq j \quad (28)$$

$$\Phi_{k,j} = 0 \text{ for } k = j \quad (29)$$

$$D = \text{diag}[[\text{trace}(V_1^H H_1 U_1 U_1^H H_1^H V_1)/(\gamma_1), \ldots, \text{trace}(V_K^H H_K U_K U_K^H H_K^H V_K)/(\gamma_k)]] \quad (30)$$

$$\sigma = [\text{trace}(U_1^H (I_{N_t} + \Lambda) U_1), \ldots, \text{trace}(U_K^H (I_{N_t} + \Lambda) U_K)]^T \quad (31)$$

$$p = (D - \Phi^t)^{-1} \sigma \quad (32)$$

The function SubgradLambda, as discussed above, is used in the Subgradient method of updating $\Lambda$. The function SubgradLambda is defined by the following relations:

$$[p^{ant}]_i = \left[\sum_{k=1}^{K} \frac{p_k}{L_k} U_k U_k^H\right]_{i,i} \text{ for } i = 1 \ldots N_t. \quad (33)$$

$$\lambda_i = \max(0, \lambda_i - \alpha([p^{ant}]_i - P_i)), \forall i \quad (34)$$

$$\forall j, \lambda_j = \frac{\lambda_j}{\left(\min_{i=1}^{N_t} \lambda_i\right)}, \text{ if } \lambda_i > 1, \forall i \quad (35)$$

The function MacRxMSINR, as discussed above, is used in the Uplink Receive MSINR Beamforming. The function MacRxMSINR is defined by the following relations:

$$R_{s,k} = q_k H_k^H V_k V_k^H H_k \tag{36}$$

$$R_{n,k} = (I_{N_t} + \Lambda) + \Sigma_{j \neq k} q_j H_j^H V_j V_j^H H_j \tag{37}$$

$$U_k = \text{eig}(R_{s,k}, R_{n,k}) \tag{38}$$

When maximizing the SINR given a sum power constraint, one must formulate the following:

$$\max_{p,U} \min_k \frac{SINR_k}{\gamma_k} \tag{39}$$

$$\text{s.t.} \sum_{i=1}^{N_t} \left[ \sum_{j=1}^{K} \frac{p_j}{L_j} U_j U_j^H \right]_{i,i} \leq P_{max} \tag{40}$$

$$\left[ \sum_{j=1}^{K} \frac{p_j}{L_j} U_j U_j^H \right]_{i,i} \leq P_i, i = 1, \ldots, N_t \tag{41}$$

Figure 3:
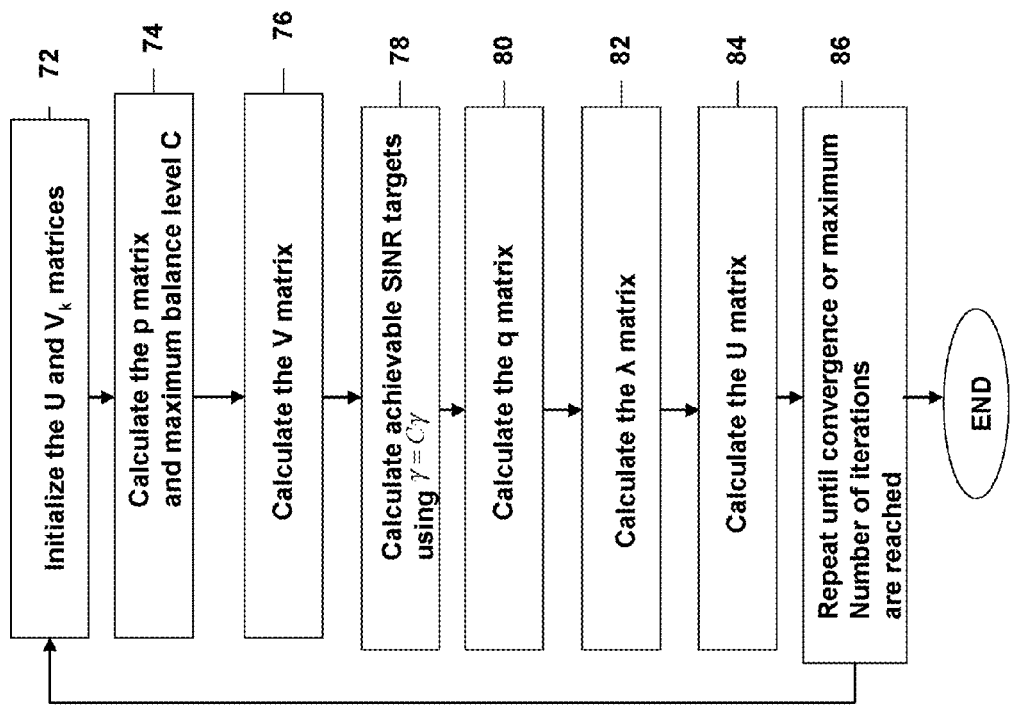
FIG. 3 is a process flow illustrating the step for the SINR maximization under Sum Power Constraint.

FIG. 3 is a process flow illustrating the step for the SINR maximization under Sum Power Constraint. First, the $V_k$ matrix is initialized as some random matrix and $\lambda_k = 0$, and the U matrix is initialized as a transmit MMSE filter, as shown in step 72. The p matrix and C are calculated using the function BcPA_sump used in allocating the total power to each user to achieve the maximum balance level C, as shown in step 74. The V matrix is calculated using the function BcRxMSINR used in downlink receive MSINR beamforming, as shown in step 76. The current achievable SINR targets are calculated using the following relation $\gamma = C\gamma$, as shown in step 78. The q matrix is calculated using the function MacPA_inv used in uplink power allocation, as shown in step 80. The $\lambda$ matrix is calculated using the function SubgradLambda used in the Subgradient method, as shown in step 82. The U matrix is calculated using the function MacRxMSINR used in the uplink receive MSINR beamforming, step 84. The following steps 74-84 are repeated until convergence or the maximum number of iterations is reached, as shown in step 86. The convergence is defined as when the balanced level C in the current iteration and previous iteration is less than a small constant $\epsilon$.

As discussed above, the function BcPA_sump for downlink power allocation using the Sum Power Constraint is defined by the following relations:

$$\Phi_{k,j} = \text{trace}(V_k^H H_k U_j U_j^H H_k^H V_k^H) \text{ for } k \neq j \tag{42}$$

$$\Phi_{k,j} = 0 \text{ for } k = j \tag{43}$$

$$D = \text{diag}[\text{trace}(V_1^H H_1 U_1 U_1^H H_1^H V_1^H)/(\gamma_1), \ldots, \text{trace}(V_K^H H_K U_K U_K^H H_K^H V_K^H)/(\gamma_K)] \tag{44}$$

$$\sigma = [\text{trace}(U_1^H (I_{N_t} + \Lambda) U_1), \ldots, \text{trace}(U_k^H (I_{N_t} + \Lambda) U_k)]^T \tag{45}$$

$$[\beta]_k = \frac{1}{L_k} \sum_{i=1}^{N_t} [U_k U_k^H]_{i,i} \tag{46}$$

$$\Psi = \begin{bmatrix} D^{-1}\Phi & D^{-1}\sigma \\ \frac{1}{P_{max}} \beta^T D^{-1}\Phi & \frac{1}{P_{max}} \beta^T D^{-1}\sigma \end{bmatrix} \tag{47}$$

$p^{ext} = \text{eig}(\Psi)$ (eigenvector corresponding to the largest eigenvalue) (48)

Normalize $p^{ext}$ such that $[p^{ext}]_{K+1} = 1$. Then let $p = [[p^{ext}]_1, \ldots, [p^{ext}]_K]^T$.

The functions BcRxMSINR, MacPA inv, SubgradLambda, and MacRxM_SINR are exactly the same as described in FIG. 2.

Simulations confirmed that the inventive technique requires least power compared to other methods, including ZF BD and It is worth noting that neither the proposed technique nor SLNR can guarantee feasible solution. In particular, the proposed technique won't converge for some instances. One reason for this phenomenon is, SLNR and the proposed technique allow the interference to be non-zero. Thus, base station can fall back to BD when the proposed technique (or SLNR) is not feasible. Having this feasibility into account, the proposed techniques still outperforms other techniques, especially in low to moderate SNR range.

The invention exploits the Maximum SINR filtering to generalize the MMSE approach to support multiple data streams. The invention proposed two algorithms for a non-codebook-based precoder design. One is to minimizes the total transmit power under per user SINR target constraints; the other is to maximize the SINR to target ratio under a total power constraint. The numerical simulation demonstrates that the invention can achieve much better performance compared to other conventional schemes such as BD, ZF, and SLNR.

Although the present invention has been shown and described with respect to several preferred embodiments thereof, various changes, omissions and additions to the form and detail thereof, may be made therein, without departing from the spirit and scope of the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication system comprising:
    a base station comprising a plurality of precoders, wherein the base station receives a plurality of input signals that are selectively provided to the plurality of precoders, the plurality of precoders preforms precoding operations on the plurality of input signals and outputs a first output signal, the base station comprises at least two separate algorithms, wherein a first algorithm minimizes total transmit power per antenna under signal to interference and noise ratio (SINR) target constraints, and a second algorithm maximizes an SINR under a sum power constraint per data stream;
    wherein each of the at least two separate algorithms is to determine a power allocation and obtain a plurality of efficient precoders;
    wherein the each of the at least two separate algorithms iteratively update downlink power allocation, downlink beamformers, uplink power allocation, a plurality of Lagrange multipliers, and uplink beamformers, and the each of the at least two separate algorithms stops when the downlink power allocation and uplink receive beamformers converge
    wherein the downlink power allocation is calculated by further minimizing a sum power with per-antenna power constraints of the base station with the SINR targets.

2. The wireless communication system of claim 1, wherein the base station comprises one or more antennas for transmission of the first signal.

3. The wireless communication system of claim 1, further comprising a plurality of mobile receiver units that receive the first signal and perform their respective operations to estimate the input signals; wherein the mobile receiver units comprise a receiving beamformer.

4. The wireless communication system of claim 3, wherein the receiving beamformer comprises an equalizer.

5. The wireless communication system of claim 4, wherein the receiving beamformer receives the signal and outputs linear estimates associated with the respective mobile receiver units.

6. The wireless communication system of claim 4, wherein the receiving beamformer comprises a minimum mean square error (MMSE) filter.

7. The wireless communication system of claim 4, wherein the receiving beamformer comprises a Maximum SINK (MSINR) filter.

8. The wireless communication system of claim 1, wherein the algorithm initializes a transmit beamformer as a transmit MMSE filter.

9. A method of performing the operations of a wireless communication system comprising:
   using a base station comprising a plurality of precoders, wherein the base station receives a plurality of input signals that are selectively provided to the plurality of precoders, the plurality of precoders preforms precoding operations on the plurality of input signals and outputs a first output signal, the base station comprises at least two separate algorithms, wherein a first algorithm minimizes total transmit power per antenna under signal to interference and noise ratio (SINR) target constraints, and a second algorithm maximizes an SINR under a sum power constraint per data stream;
   wherein each of the at least two separate algorithms is to determine a power allocation and obtain a plurality of efficient precoders;
   wherein the each of the at least two separate algorithms iteratively update downlink power allocation, downlink beamformers, uplink power allocation, a plurality of Lagrange multipliers, and uplink beamformers, and the each of the at least two separate algorithms stops when the downlink power allocation and uplink receive beamformers converge
   wherein the downlink power allocation is calculated by further minimizing a sum power with per-antenna power constraints of the base station with the SINR targets.

10. The method of claim 9, wherein the base station comprises one or more antennas for transmission of the first signal.

11. The method of claim 10, wherein the receiving beamformer comprises an equalizer.

12. The method of claim 10, wherein the receiving beamformer receives the signal and outputs linear estimates associated with the respective mobile receiver units.

13. The method of claim 12, wherein the receiving beamformer comprises a minimum mean square error (MMSE) filter.

14. The method of claim 12, wherein the receiving beamformer comprises a Maximum SINR (MSINR) filter.

15. The method of claim 9, wherein the wireless communication system further comprises a plurality of mobile receiver units that receive the first signal and perform their respective operations to estimate the input signals; and the mobile receiver units comprise a receiving beamformer.

16. The method of claim 9, wherein the algorithm initializes a transmit beamformer as a transmit MMSE filter.

* * * * *